July 30, 1935.　　　C. C. DAVIS　　　2,009,915
GEARING
Filed Aug. 25, 1931　　　2 Sheets-Sheet 1
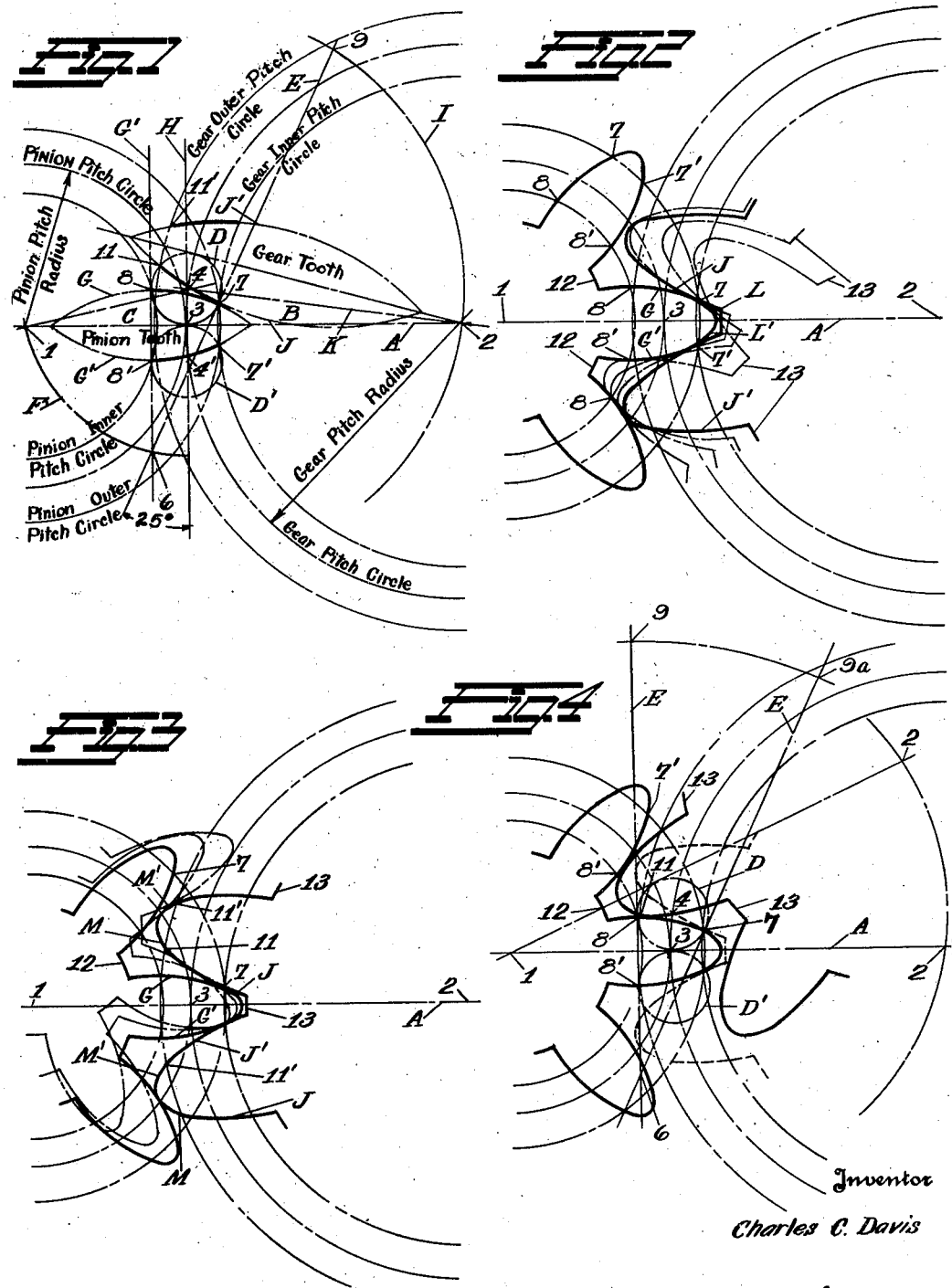
Inventor
Charles C. Davis
By
Strauch & Hoffman
Attorneys July 30, 1935.　　　C. C. DAVIS　　　2,009,915
GEARING
Filed Aug. 25, 1931　　2 Sheets-Sheet 2
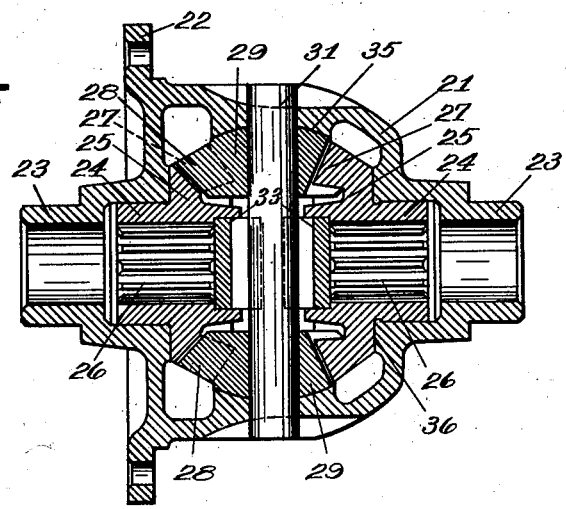
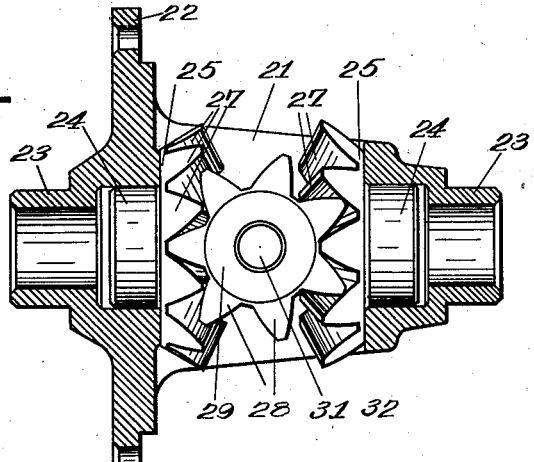
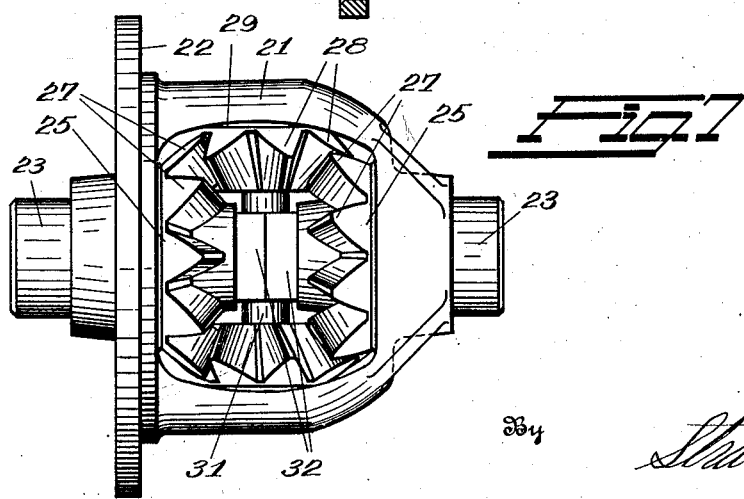
Inventor
Charles C. Davis
By
Strauch & Hoffman
Attorneys Patented July 30, 1935

2,009,915

UNITED STATES PATENT OFFICE 2,009,915

GEARING

Charles C. Davis, Detroit, Mich., assignor to Timken-Detroit Axle Company, Detroit, Mich., a corporation of Ohio Application August 25, 1931, Serial No. 559,273

7 Claims. (Cl. 74—462)

The present invention relates to improvements in gearing, and more particularly to improvements in gearing of the type in which a periodic variation in leverage or torque ratio occurs between mating gears especially useful in automotive differential mechanisms, but applicable to other purposes, as for example in valve timing drive mechanisms and the like.

United States Patents #1,406,627 and #1,409,535 disclose the application of earlier forms of variable leverage gearing to spur gear types of differential drive mechanisms. The present invention primarily comprises improvements in tooth forms for use in such gearing, and improvements in the application thereof to differential mechanisms for automotive purposes. My invention is especially beneficial in motor vehicles in preventing complete loss of traction when one of a set of differentially driven wheels slips in a single axle or a compensated or differentiated dual axle drive, thereby increasing the tire life and safety of vehicles equipped therewith materially. In addition skidding and side slip tendencies due to sudden engagement of a vehicle clutch and due to uneven application of brakes is minimized, making the invention highly desirable in all classes of motor vehicles.

In such variable leverage gearing, as the mating gears rotate, the point of driving contact of the teeth in mesh with each other varies along a substantial arc of action between inner and outer pitch circles and this variation of the point of contact produces periodic variations in leverage or torque transmitted, the range of which for any given set of gears is determined by the tooth shapes and gear proportions. Because of this variation in the point of contact the usual methods of developing the tooth curves for gearing cannot be utilized, and the variable leverage tooth forms disclosed in said Patents #1,409,535 and #1,406,627 were developed by "cut and try" or empiric methods. In efforts to produce such gearing by quantity production methods and at low cost, tooth forms as closely as possible to the forms developed by the previous "cut and try" methods were provided. Such teeth were cut utilizing forms laid out by making the pitch radii of the gear and pinion of a mating pair of gears determined in the manner used in calculating ordinary gearing of a like number of teeth and with the same center distances intersecting at a point midway between the points of intersection of the inner and outer pitch radii of the gear and pinion, making the chordal thickness of the pinion and gear teeth equal at their outer radii to establish points of contact on the outer and inner pitch circles of the gear and pinion, and between these points the assumed curve of action of the tooth was laid in as a circular arc having an empirically determined radius which has differed materially from the main pitch radius of the gear. The outer profile of the tooth was then generated by rolling the profile radius in a rack space having an angle equal to twice the pressure angle. The forms thus developed were utilized as templets in cutting the gear teeth in quantity.

Such prior teeth, while operative, were of such form that interference developed particularly at the ends of the teeth, and uncontrollable and undesirable variations in back lash occurred between the extreme meshing positions of the teeth of pairs of mating gears. The interferences set up in the teeth and the variations in backlash introduced excessive bearing pressures and internal stresses, strains and irregular operation in differential mechanisms, which under the severe conditions of automotive service caused premature break downs of the mechanisms, and introduced maintenance and service requirement repair costs that made differential mechanisms embodying prior tooth forms impractical for use in commercial motor vehicles and pleasure cars. In addition the shapes were such as to reduce the practical leverage variations and accordingly the effectiveness of such gearing considerably below that made possible practically by the present invention. Heretofore variable leverage differential mechanisms have accordingly been limited to vehicles in which long length of life of the mechanism with freedom from troubles in operation do not have the extreme importance attached to these qualities in the modern pleasure car and commercial motor vehicle field.

I have discovered that by utilizing tooth forms for variable leverage spurs and bevel gearing having curves of action formed of circular arcs between their inner and outer pitch circles having radii equal to the main pitch radii for mating spur gears, and equal to the main back cone pitch radii for mating bevel gears, it is possible to provide such gearing in which a maximum leverage variation is secured, tooth interference is eliminated, and uniform back lash is secured. Very small variations from these radii in the curves of action will in practice cause tooth interference and material back lash variations. Accordingly, the use of the main pitch radii for the curves of action in spur gear tooth forms, and the main back cone pitch radii for the curves of action of bevel tooth forms is a highly important feature of my invention.

Accordingly, a primary object of the present invention is the provision of novel tooth forms for variable leverage gearing that eliminates variations in back lash, and eliminates substantial tooth interferences, and which may be produced with sufficient accuracy and at sufficiently low cost in large volume to permit their use in all classes of motor vehicle differential mechanisms, motor timing mechanisms and the like.

Another object of the invention is the provision of variable leverage gearing giving a maximum effective periodic variation of torque or leverage in any given set of meshing gears with uniform backlash and without substantial interference.

The conventional modern automobile differential mechanism is however a differential mechanism of the bevel gear type while spur gear differentials are disclosed in said Patents #1,406,627 and #1,409,535. In applying the principles of the variable leverage gearing to bevel gear differentials the tooth forms were laid out on the assumption that the forms developed for spur gearing would be satisfactory in bevel gearing. The use of such forms, however, introduced further material inaccuracies in the tooth forms which reduced the limits of torque variation practically and accordingly the practical effectiveness of the mechanism, and limited the life and usefulness of such bevel gear differential mechanisms under that of the spur gear mechanisms. It was furthermore found that unless an even number of teeth are used in the differential side gears, and an odd number in meshing bevel pinions, the variations in leverage on the opposite axle shafts driven members occur simultaneously and the instantaneous power transmitted to the driven members is equal, with no advantage gained by the use of the variable leverage gearing in the mechanism.

Accordingly, another object of the present invention is to provide a novel bevel gear type of differential mechanism embodying variable leverage gearing in which when the axle shafts or the members are rotating at different speeds the power applied thereto varies periodically and alternately between limits amply sufficient to prevent the complete loss of traction that occurs with the conventional differential mechanisms when one of the wheels loses its traction while permitting free differentiation for the normal vehicle operation. In this way the skidding tendencies are minimized when the clutch is engaged suddenly in a motor vehicle embodying the invention on a slippery road, or when uneven application of the brakes occurs.

Further objects of the present invention will appear from the following detailed description of preferred embodiments thereof and are such as may be obtained by utilization of the various combinations, subcombinations, steps and principles hereinafter set forth, and defined by the scope of the appended claims.

Referring to the drawings:

Figure 1 is a diagrammatic illustration of a method of determining the curves of action and laying out the curves of action of a meshing or mating set of gears embodying my invention.

Figure 2 is a diagrammatic illustration of the method of generating the outer profile tooth curves for the pinion of a set of gears for which the curves of action have been determined in accordance with the method illustrated in Figure 1.

Figure 3 is a diagrammatic illustration of a method of generating the outer profile tooth curve for the gear of a set for which the curves of action have been developed in accordance with the method illustrated in Figure 1.

Figure 4 is a diagrammatic illustration of the manner in which mating gears embodying the tooth forms developed in accordance with the methods illustrated in Figures 1 to 3 inclusive, mesh with a rolling action, without interference, and without variation in backlash in their extreme meshing positions.

Figure 5 is a sectional view showing a bevel gear differential mechanism embodying my improved variable leverage gearing.

Figure 6 is a view partly in section looking at the back of a bevel pinion in the differential mechanism shown in Figure 5.

Figure 7 is a side view of the differential mechanism shown in Figure 5 illustrating the meshing relationship of the variable leverage bevel pinions and gears essential to secure the benefits above set forth, of my invention.

Since from the viewpoint of increased wear and life rolling contact of gear teeth is preferable, the preferred embodiments of my invention hereinafter set forth are selected to provide tooth forms that will provide rolling contact between the meshing teeth. In applying my invention, the number of teeth in the mating gears, the pressure angle, and the desired center spacing of the gears are selected to meet particular requirements of the mechanism for which the gears are to be designed. In Figures 1 to 4 the design of a seven tooth spur pinion and meshing twelve tooth spur gear with a twenty-five degree pressure angle is illustrated.

The center point 1 of the pinion and the center point 2 of the gear are then established to a definite scale on the base line A, and the distance between points 1 and 2 on base line A is then divided by point 3 in the ratio of the pinion and gear teeth. Accordingly, the distance from points 1 to 3 for a 7–12 tooth ratio, is $7/19$ of the distance between points 1 and 2 and the distance between points 2 and 3 is $12/19$ of the distatnce between points 1 and 2. The pinion and the gear pitch circles are then laid in with points 1 and 2 respectively as centers passing through the point 3 on the base line A as indicated. Point 4 of the triangle 1—2—4 is then established by laying off angle B equal to 360 divided by four times the number of teeth in the gear, and angle C equal to 360 divided by four times the number of teeth in the pinion, the lines so drawn from points 1 and 2 establishing the point 4 at their intersection, and forming the sides 1—4 and 2—4 of triangle 1—2—4.

With point 4 as a center circle D is now drawn tangent to line A as shown. The tooth pressure line E is then drawn tangent to circle D at an angle with a line perpendicular to line A equal to the selected pressure angle which in the selected example is 25° as indicated in Figure 1. With point 4 as a center the arc F passing through point 1 is then drawn to establish point 6 at the intersection of the pressure angle line E and the arc F. With point 6 as a center and a radius equal to the pinion pitch circle radius, arc G forming the profile for the curve of action of the pinion tooth is then drawn. Arc G will be then found intersecting circle D at points 7 and 8.

Points 7 and 8 are the end points of the curve of action of the pinion tooth curve and are located on the outer and inner pitch circles of the pinion respectively.

Circle D' and curve G' for the opposite side of the tooth may be drawn in similar manner from centers 4' and 6' located in like manner on the opposite side of line A, so that line A will be the center line of the pinion tooth. However, since the tooth is symmetrical about line A as a center, the centers 4' and 6' can be located by drawing lines H and G' through centers 4 and 6 perpendicular to line A, and laying off the distances from line A to the points 4' and 6' equal to the distance from the line A to the points 4 and 6.

To develop the curve of action of the mating gear tooth, with point 4 as a center, the arc I is drawn through point 2 to intersect the pressure angle line E at point 9. With point 9 as a center and a radius equal to the pitch radius of the gear, arc J is drawn. It will be found that arc J will pass through and will be tangent to arc G' at point 7. Arc J intersects the circle D at point 11 and the section of arc J between points 7 and 11 forms the curve of action of the gear tooth. Line K is then drawn from point 2 to the center of circle D and forms the center line of the gear tooth. With line K as the tooth center, the arc J' forming the opposite side of the gear tooth is now laid in symmetrically or is laid in symmetrically with relation to arc J, in a manner that will be apparent to those skilled in the art.

The outer profile of curves L and L' of the pinion tooth from points 7 and 7' are developed by rolling the arcs of action J and J' of adjacent gear teeth as shown in Figure 2 on the arcs of action G and G' of the pinion tooth. Curves L and L' will then be of such shape that no interference of the tops of the pinion teeth will occur in meshing with the gear teeth.

In like manner, the gear teeth are topped off from points 11 and 11' by rolling the curves of action G and G' of adjacent pinion teeth on the curves of action J and J' of the gear tooth as shown in Figure 3, thereby generating the outer profile curves M and M' of such shape as to prevent interference of the ends of the gear teeth as they mesh with the pinion teeth.

The curves G, G', J and J' are extended inward beyond the inner pitch circles of the gear and pinion which pass through points 7 and 8 respectively to the bottoms 12 and 13 of the spaces between the teeth a sufficient distance to provide ample clearance for the ends of the teeth as illustrated in Figures 2 and 3 completing the shapes for the pinion and gear teeth. Forms may then be cut to the shape of the teeth and utilized as cams or templates for producing the gears with my improved tooth forms in accordance with gear cutting practices well known to those skilled in the art.

The manner in which a gear and pinion having teeth developed in accordance with the method illustrated in Figures 1 to 3 mesh, is illustrated in Figure 4 in which the gear is shown rolling about the pinion with the pinion held stationary. The full line position of the gear and pinion teeth illustrates the manner in which the teeth mesh in one extreme position with points 8 and 11 of the meshing teeth coinciding and in a line joining the centers of the contacting tooth curves 6 and 9. The dotted line position of the gear teeth illustrates the meshing relationship in the opposite extreme position of the pair of contacting teeth with points 7 of the tooth curves in a line drawn through the center 6 of the pinion tooth curve, and the center of the meshing gear tooth curve which is located at 9a. As the gear rolls with relation to the pinion, the center of the gear tooth curve of action moves along arc 9—9a, and a line joining the centers of the engaged curves of action of the meshing teeth will be normal to the engaging curves of action of the engaging teeth and will pass through point of contact of the engaging curves throughout the range of contact.

It will accordingly, be seen that rolling contact and uniform back lash is secured with no interference of the outer tooth profiles in all positions of meshing engagement of my improved variable leverage teeth, highly important practical results not heretofore secured in variable leverage gearing. It is to be noted that the chordal thicknesses of the pinion and gear teeth at the outer pinion and gear pitch circles are unequal in the illustration given, while as above pointed out in the prior variable leverage gear tooth forms, these thicknesses were made equal.

In my improved gearing so far described, the point of driving contact between the teeth varies between the inner and outer pitch circles of the gears along the curves of action of the teeth, varying the leverage or torque ratio alternately in a manner that will be apparent to those skilled in the art, with uniform back lash, a rolling action, and no tooth interference.

The method of generating variable leverage tooth forms so far described is applicable to spur gearing. In developing tooth forms for bevel gearing, it has heretofore been the practice to use forms developed for spur gearing. I have however, discovered that the use of spur gear forms for bevel gearing introduces inaccuracies which are highly undesirable in practice. These inaccuracies I have found may be eliminated by following the general method of developing the curves of action illustrated in Figure 1, with the following exceptions for bevel gearing, namely, the distance between points 1 and 3 on line A is made equal to the back cone distance of the pinion and the distance between points 2 and 3 is made equal to the back cone distance of the gear. The angle B is made equal to 360° divided by four times the number of teeth in the back cone diameter of the gear and the angle C is made equal to 360° divided by four times the number of teeth in the back cone diameter of the pinion. The radii for the curves of action G and G' and J and J' are then made equal to the back cone distance of the bevel pinion and gear.

It has been found in practice that an eleven inch Gleason straight tooth generator with a cone distance of 17.5 provided with suitable cams or templates to guide the motion of the tools will cut all sizes of bevel gears for practical automotive differential mechanisms. Because of the nature of the mechanism of such a Gleason generator certain deviations from the desired tooth curves developed as above set forth are introduced in the cams or forms used. In the pinion cam for an eleven inch Gleason generator, the outer curve of action section is developed as hereinbefore set forth, but the outer profile curve section of the cam is generated by passing the cam through a rack space having an included angle equal to twice the pressure angle of the tooth.

In cutting my improved bevel gears in an eleven inch Gleason straight tooth generator it has been found that with the cutters set at an included angle of twice the pressure angle, and tangent to the tooth profile at point 7, Figure 1, the curves of action of the gear teeth will not be accurately generated if the profile radius or the curve of action section of the cam is equal to the back cone radius of the gear, due to the difference in ratio between the pitch radii and the back cone radii. To compensate for this inaccuracy, the radius for the curve of action section of the gear cam for an eleven inch Gleason straight tooth generator is made less than the back cone radius of the gear. The radius for the curve of action for such a gear cam is therefore determined by selecting a radius on the tooth curve layout that will top off the outer profile radius of the gear tooth generated by rolling the pinion tooth form on the gear tooth form using the back cone radii for the curves of action in the manner illustrated in Figure 3. The radius for the curve of action of the gear cam selected in this way will bear the same ratio to the back cone radius of the pinion, as the pitch radius of the gear bears to the pitch radius of the pinion. Such cams it will be found when used with an eleven inch Gleason straight tooth generator will cut the tooth forms that will mesh with rolling contact between the inner and outer pitch radii of the mating gears with uniform backlash and with a maximum leverage or torque ratio variation for any given set of gears.

The corrections indicated in the cam forms for cutting my variable leverage bevel gear teeth are peculiar to the eleven inch Gleason straight tooth generator with 17.5 cone distance, and it will be understood by those skilled in the art that for different types of machine other corrections may be desirable, which can be determined experimentally for any given type of gear cutting machine. When my improved gearing is die forged, the dies will of course be shaped to accurately form the teeth.

To provide a maximum bearing surface on my improved bevel gears for use in automotive differential mechanisms, as illustrated in Figures 5, 6 and 7, the tops of the outer profiles of the teeth are cut off instead of continuing the outer profile curves until they join as illustrated for spur gearing. In the gearing illustrated, in practice with a seven tooth pinion and a twelve tooth gear a flat on top of the teeth of not less than one eighth of an inch is preferably provided. Such a set of gears for an automotive bevel gear differential mechanism with a pinion addendum of 2.4375, a gear addendum of 2.375, and a clearance of 0.250 with a pinion and gear pitch radii of 8.8177, and 15.1161, respectively have given excellent practical results.

A preferred manner in which my improved variable leverage bevel gearing is utilized in the usual place of automotive bevel gear differential mechanism is illustrated in Figures 5 to 7, in which a two pinion differential mechanism is shown.

This mechanism comprises a differential housing 21 provided with a flange 22 to which the usual ring gear (not shown) for driving the differential mechanism is secured. Housing 21 is provided with tubular bearing extensions 23 by means of which it is journalled in well known manner in the differential carrier of an automotive axle.

Journalled for rotation in suitable bores formed in housing 21 are hubs 24 of differential side gears 25 provided with splined bores 26, into which the splined ends of the usual axle shafts (not shown) slidably fit in well known manner.

Gears 25 are each provided with twelve of my improved variable leverage teeth 27 which mesh with the variable leverage pinion teeth 28 of diametrically opposite pinions 29, each pinion 29 being provided with seven teeth. Teeth 27 and 28 of gears 25 and pinions 29 are generated in the manner hereinbefore set forth in detail so that in all meshing positions thereof backlash is uniform, and a maximum leverage variation in operation of the gears is secured. As there is an even number of teeth in gears 25, and an odd number of teeth in meshing pinions 29, the teeth on opposite sides of the pinions engage with the side gears in such manner that when the leverage ratio between each pinion and one side gear is maximum, the leverage ratio between each pinion and the opposite side gear is a minimum. Also since an even number of teeth is provided in the side gears, the meshing engagement and leverage ratios of diametrically opposite pinions 29 with relation to the side gears will at all times be the same. Leverage variation between pinions 29 and the side gears will occur simultaneously and in phase and unison, and the variations of leverage ratio will alternate between the pinions and the opposite side gears of the mechanism. The maintenance of an odd number of teeth on the pinions and an even number of teeth on the side gears is highly important in applying my invention to bevel gear differential mechanisms. If an odd number of teeth is utilized in the side gears the variations of leverage with opposite pinions will not be in phase or unison, and if an even number of teeth is used in the pinions the leverage variations will not alternate between the pinions and opposite side gears, thereby losing the practical effectiveness of the variable leverage action.

Pinions 29 are journalled for rotation diametrically opposite each other on shaft or spindle 31 the ends of which are supported in suitable bores formed in the differential housing 21. Side gear spacing members 32 are disposed centrally around shaft 31 and are provided with cylindrical extensions which fit rotatably into bores 33 of the side gears 25. Hardened complemental bearing surfaces 35 and 36 are provided on the pinions, side gears, and housing 21 respectively, to withstand the end thrust developed on the pinions and gears in operation of the mechanism.

The differential mechanism so far described is mounted on a suitable carrier and supported in the housing (not shown) of a differential axle in well known manner. During normal operation of the axle when the traction of the driven wheels of the vehicle is equal, pinions 29 will rotate with the housing without rotating about shaft 31, driving side gears 25 and the axle shafts at equal speeds. When the vehicle turns a curve, the usual compensation in rate of rotation of the axle shafts will occur freely in the usual manner, with the pinions rotating slowly on shaft 31. When however, one of the wheels of the vehicle turns ahead of the other rapidly, as occurs when the traction of one wheel is lost due to engagement with a slippery spot on the ground, relative rotation of the pinions 29 and gears 25 will occur, causing alternate leverage or torque variations and corresponding variations in the total power applied to the opposite axle shafts. As the leverage ratio on the gripping wheel increases, an increasing amount of power from the engine will be applied thereto. As a result a sufficient amount of power is in practice applied to the gripping wheel to drive the vehicle. The complete loss of traction that occurs with the ordinary differential mechanism when one wheel of a differentially driven pair loses its traction is completely eliminated by use of my invention. Also when a sudden unequal application of the brakes to the wheels of a vehicle embodying my invention occurs tending to throw the vehicle into a skid, sufficient resistance to rotation of housing 21 will occur so that effect of the variable leverage gearing will resist the tendency of the unbraked wheel to turn faster than the braked wheel, thereby minimizing the skidding tendencies and increasing the safety of the vehicle operation. A further beneficial effect in vehicles embodying my improved differential is secured in practice in starting the vehicle from rest on a slippery road, as for example, when starting from an icy gutter in winter weather, or when stopped on a slippery road waiting for traffic to move. Under such circumstances, in vehicles embodying my improved differential mechanism the leverage variation produced in the gearing as the differential gears tend to rotate with relation to each other due to wheel slippage, prevents loss of traction and side slipping of the vehicle, and ample traction is found to exist in practice to move the vehicle under adverse conditions. On a slippery road while waiting for traffic to start, the clutch of a vehicle embodying my invention may be engaged suddenly without the tendency of the vehicle to sideslip, present with vehicles under similar conditions embodying the usual differentials.

My improved differential mechanism is highly useful for dividing power in compensating drives for multi-wheel road vehicles and when so utilized prevents the complete loss of traction on all wheels of a tandem pair of driven axles that occurs in the usual compensated differential type of dual axle multi-wheel road vehicle drives when one of the wheels loses its driving grip.

While my invention has been described specifically as applied to a variable leverage differential mechanism for motor vehicles, it will be understood that my improved gearing is applicable to a variety of mechanisms in which movement in periodic variations of leverage, torque or speed ratios are desirable, as for example, in drives for timing mechanisms for motors and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. Tooth forms for mating variable ratio gearing having curves of action corresponding substantially to curves developed by laying out a triangle having a base drawn to a definite scale between points established as the gear centers and sides at angles to the base equal to 360 degrees divided by four times the number of teeth in the respective gears; drawing a circle tangent to said base having the apex of said triangle as a center; drawing a pressure angle line tangent to said circle at an angle with said base complemental to the selected tooth pressure angle; and describing circular arcs in said circle having their centers in said pressure angle line on opposite sides of the point of tangency of said pressure angle line with said circle and passing through said point of tangency; said circular arcs forming the curves of action of the gear teeth and having such curvatures that the teeth so formed will mesh with substantially uniform backlash in all relative meshing positions of the gearing.

2. Tooth forms of the character set forth in claim 1 in which said circular arcs having a radius of curvature equal to the main pitch radii of their respective gears.

3. Tooth forms for mating variable ratio bevel pinions and gears having curves of action corresponding substantially to curves developed by laying out a triangle having a base drawn to a definite scale equal in length to the back cone distance of the gears and sides at angles to the base equal to 360 degrees divided by four times the number of teeth in the back cone circles of the pinion and gear, drawing a circle tangent to said base having the apex of said triangle as a center; drawing a pressure angle line tangent to said circle at an angle with said base complemental to the selected tooth pressure angle; and describing circular arcs in said circle having their centers in said pressure angle line on opposite sides of the point of tangency of said pressure angle line with said circle and passing through said point of tangency; said circular arcs forming the curves of action of the gear teeth and having such curvatures that the teeth so formed will mesh with substantially uniform back lash in all relative meshing positions.

4. Tooth forms of the character set forth in claim 3 in which the circular arcs for said teeth on the back cone of the gearing have radii of curvature equal to the back cone pitch radii of the mating gears.

5. A meshing variable leverage pinion and gear, having differing numbers of teeth and main pitch circles with radii bearing a ratio to each other equal to the ratio of the pinion and gear teeth, the teeth of said pinion and gear being formed respectively to provide curves of action constituting arcs of circles drawn with radii equal to the main pitch radii of the pinion and gear.

6. A variable leverage gear having a tooth profile of arcuate form, the radius of the arc of the profile corresponding to the radius of the main pitch circle.

7. A variable leverage bevel gear having a toothed profile of arcuate form, the radius of the arc of the profile corresponding to the radius of the back cone circle.

CHAS. C. DAVIS.

CERTIFICATE OF CORRECTION.

Patent No. 2,009,915. July 30, 1935.

CHARLES C. DAVIS.

It is hereby certified that error appears in the above numbered patent requiring correction as follows: In the drawings, Sheet 1, figure 1, for the legend "Gear Pitch Radius" read Gear Back Cone or Pitch Radius; for "Gear Pitch Circle" read Gear Back Cone or Pitch Circle; for "Pinion Pitch Radius" read Pinion Back Cone or Pitch Radius; and for "Pinion Pitch Circle" read Pinion Back Cone or Pitch Circle; and that the said Letters Patent should be read with this correction therein that the same may conform to the record of the case in the Patent Office.

Signed and sealed this 13th day of December, A. D. 1938.

Henry Van Arsdale (Seal) Acting Commissioner of Patents.